Figure 1:
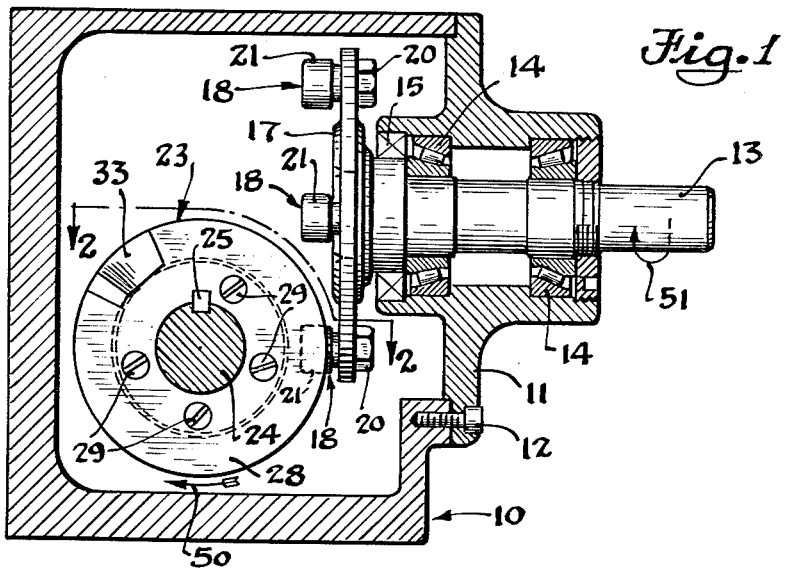

Aug. 14, 1962  J. A. McDONALD ETAL  3,049,017
INDEXING CAM STRUCTURE
Original Filed Feb. 4, 1959

INVENTORS
Howard H. Evans
James A. McDonald
BY Frost & Vandenburgh
Attys.

United States Patent Office 3,049,017
Patented Aug. 14, 1962

3,049,017
INDEXING CAM STRUCTURE
James A. McDonald, Oak Lawn, and Howard H. Evans, La Grange Park, Ill., assignors to Commercial Cam & Machine Co., Chicago, Ill., a corporation of Illinois
Original application Feb. 4, 1959, Ser. No. 791,121, now Patent No. 2,999,311, dated Sept. 12, 1961. Divided and this application Nov. 4, 1960, Ser. No. 67,202
5 Claims. (Cl. 74—84)

The present invention relates to a precision indexing cam.

The present application is a division of our presently pending application Serial No. 791,121, filed February 4, 1959 and now Patent No. 2,999,311.

The greatly expanding utilization of automatic machinery creates an ever increasing demand for a structure to rotate a shaft a given increment, stop the shaft at an exact point and thereafter rotate the shaft again. Structures for doing this are not new. One of the best known examples is the Geneva drive. Another is an indexing cam which has a dwell period in the cam track so that as long as the follower is engaged in that portion of the cam track, a continued rotation of the cam will not change the rotational position of the shaft on which the cam follower is mounted.

The problem with all of these structures is to obtain an extremely high order of accuracy of the rotational position of the follower shaft during the dwell period. While it might seem that a few seconds of arc would make little difference as far as the rotational position of a shaft is concerned, since it would be so small as to be almost undetectable by the human eye, yet it can be very significant in numerous machine applications. For example, take the case of a machine having a shaft controlling the position of a wheel six feet in diameter upon which wheel parts are moved from one station to the next to go through a sequence of operations. In such a case a few seconds of arc of movement or misalignment of the shaft can be important when it is measured at a distance of three feet away from the center line of the shaft. Of course, the larger is the wheel the more noticeable any misalignment becomes.

The problem usually is a twofold problem. In the first place the wheel, for example, carrying the parts must be stopped at an exact position for an operation to be performed at the right location on the part. The second phase of the problem is that no movement should occur during the dwell period when the operation actually is being performed on the part. That is, there should be no "slop" or "play" with the wheel wobbling back and forth while the operation on the part is going on.

A cam follower riding in a cam track normally takes the form of a wheel which rotates as it moves through the cam track so as to avoid friction and reduce wear. For the cam follower to rotate within an enclosed track it must be made smaller in diameter than the width of the track. If this were not the case, the cam would bind along the sides of the track, resulting in friction and wear until reaching a dimension that was smaller than the width of the track. The very fact that the cam necessarily must be smaller in diameter than the width of the track means that there is room for play. It is this play that prevents the obtaining of the very accuracy that is desired.

Several proposals have been made to solve this problem. One such proposal is to use two such cam tracks, one on top of the other at different radial distances from the axis of the cam. The cam then operates in conjunction with two cam followers positioned adjacent each other on the same shaft. Another proposal is to use cam followers positioned side by side which fit into a pair of generally parallel cam tracks. The cam followers are spaced a distance apart such that they press on opposite sides of the ridge between the cam tracks (in some instances this is a tapered ridge) thus preventing movement of the member that connects the two cam followers during the dwell period. While these achieve an accuracy of positioning not found in the majority of other structures, they have one important disadvantage, namely the item of cost of manufacture. The accuracy of machining required to obtain the fit between the pairs of cam followers and pairs of tracks is of such a high order that an indexing cam and followers so made become very expensive. Thus, the principal object of the present invention is to provide a precision indexing cam of a type suited to obtain an extreme accuracy of rotational positioning, and yet one that is relatively inexpensive to manufacture.

A further object of our invention is to provide a cam which can be readily rehabilitated after it is worn through long years of use. With cams of this type the wear is relatively small since they usually are bathed in oil and involve the use of antifriction bearings wherever possible. Yet after a long history of use wear will be evident. With the usual type of cam construction where this wear has occurred to an extent such that the required precision positioning is no longer obtained, it is more practical to discard the worn cam in favor of a new cam than it is to try to rehabilitate the old cam. However, in the structure which we have devised it is a relatively simple operation to take the cam apart and machine portions thereof sufficiently to make up for the wear that has occurred. The cost of such rehabilitation of a precision cam is quite insignificant with respect to the cost of a new cam.

Figure 2:
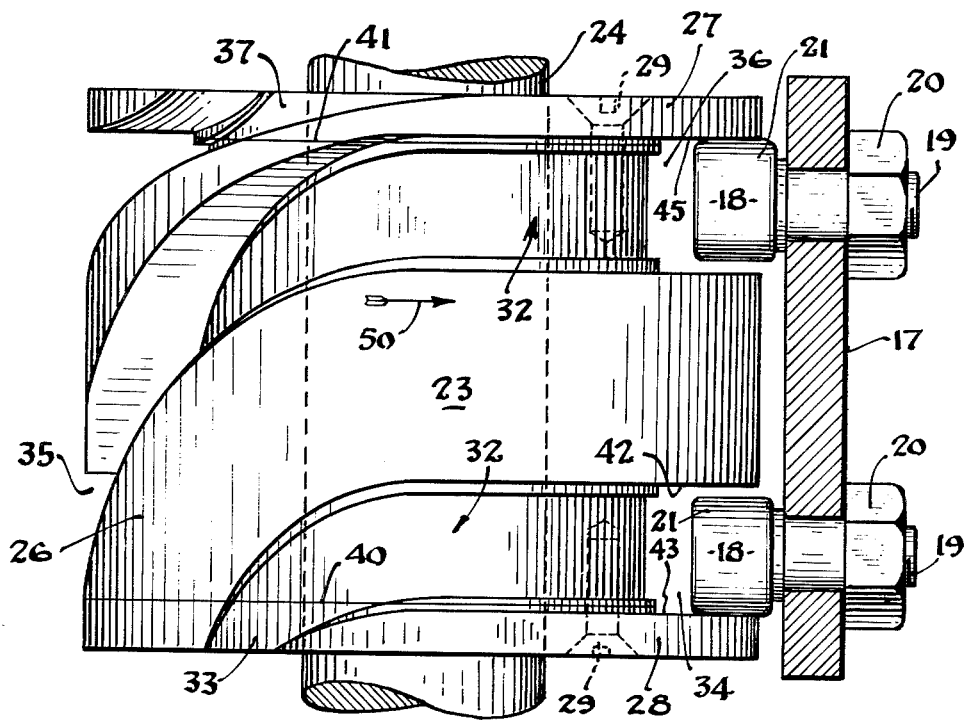

Further objects and advantages will become apparent from the following description taken in conjunction with the drawings, in which:

FIGURE 1 is an elevational cross-section through an indexing drive assembly incorporating a cam made in accordance with our invention; and FIGURE 2 is a section taken along line 2—2 of FIGURE 1.

In the illustrated embodiment the indexing drive assembly is mounted in a housing, generally 10. The housing includes a mounting plate 11 which holds the cam follower shaft. Plate 11 is held in place by a plurality of cap screws 12. The cam follower shaft 13 is rotatably mounted in a pair of bearings 14 and an oil seal 15 is provided about the shaft to prevent the leakage of oil from the housing 10.

At the inner end of shaft 13 is a cam follower mounting plate 17 carrying a plurality of cam followers, generally 18. The cam followers include a stub shaft or spindle 19 which is held in place on plate 17 by a nut 20. The followers include a follower body or outer shell 21 which is rotatably mounted on spindle 19 by a roller bearing. In the illustrated embodiment there are six of these followers, but as is well known in the art, the number of these followers could be varied depending upon the number of indexing positions required of the indexing drive assembly.

The indexing cam, generally 23, is mounted on a shaft 24 by means of a key 25. Shaft 24 is supported in a pair of bearings (not shown) in housing 10. The bearings for shaft 24 correspond to bearings 14. Oil seals corresponding to 15 also are utilized to prevent a loss of oil from around shaft 24.

Cam 23 is formed in three parts: a main body part or member 26; an end plate or member 27; and an end plate or member 28. End plates 27 and 28 are each secured to the main body 26 by a plurality of countersunk screws 29. Cam 23 has a cam track, generally 32, therein. Cam track 32 has an exit 33, a dwell portion 34, a crossover 35, a dwell portion 36 and an entrance 37.

After entering the track at 37, a follower could continue through dwell 36, crossover 35, dwell 34, and leave through exit 33.

It will be noted that the two dwell portions 34 and 36 are parallel to and are intersected by, the lines of demarcation between the end plates and the main body. Thus, the line of demarcation 40 between end plate 28 and body 26 is parallel to and intersects dwell portion 34 of the cam track. Similarly, the line of demarcation 41 between end plate 27 and body 26 is parallel to and intersects dwell portion 36 of the cam track. This is most important to our invention.

In manufacturing the cam, the preferable procedure is to assemble the body 26 with the two end plates 27 and 28. The cam track 32 is then cut into all three portions at the same time. The exact procedure for forming the cam track in the three portions of the cam body will depend upon the application involved and the machinery available to the manufacturer of the cam. Normally, the cam track will be milled, the cam then will be heat-treated to harden it, after which the cam track will be polished by grinding or otherwise.

It will be noted that dwell portion 34 of the cam track will have an inner wall 42 and an outer wall 43. Similarly, dwell portion 36 of the cam track has an inner wall 44 and an outer wall 45. Outer walls 43 and 45 are formed from end plates 28 and 27, respectively, while both inner walls 42 and 44 are formed from the main body 26. In forming the cam track 32, it will be cut so that the distance between inner walls 42 and 44 is smaller than the distance between the two adjacent sides of pairs of follower bodies 21. Thus, there will be clearance provided for the rotation of the followers. However, when the cam track 32 is formed, the distance between outer walls 43 and 45 will not necessarily be sufficiently small to equal the distance between the outer edges of two adjacent cam follower bodies 21, or certainly not sufficiently small to apply the desired amount of "preload" to the followers. This is an extremely important feature of our invention. By not having to machine and finish outer walls 43 and 45 of the dwell periods to extremely exact dimensions with respect to the positioning of the cam followers 18, the cost of forming the cam track 32 can be greatly reduced. After cam track 32 has been formed, side plates 27 and 28 are removed from body 26. At this time the portion of the side plates 27 and 28 and/or the main body 26, which portion lies along lines 40 and 41, is machined to remove some of the material therefrom. The amount of material removed is such as to bring outer walls 43 and 45 of end plates 28 and 27, respectively, closer to each other after the end plates have been reassembled on body 26. The end plates are brought sufficiently close together so that when two cam followers are positioned in the dwell periods, as seen in FIGURE 2, a pressure is applied to the outside edges of the two cam follower bodies 21 by walls 43 and 45. This pressure we refer to as "preloading."

The extent of the pressure will depend upon the particular application. It is the function of the pressure and the manner in which it is achieved that is important. Through the use of this preloading any pair of cam followers 18 when in the dwell portions 34 and 36 are fixed exactly in place. Thus, referring to FIGURE 2, plate 17 cannot move upwardly with respect to cam 23 because the top follower body is pressed against wall 45. Similarly, the plate 17 cannot move downwardly with respect to the cam because the lower follower body is pressed against the wall 43. Thus plate 17 is firmly fixed in position and correspondingly holds shaft 13 in an exact position.

While it is possible to obtain a similar preloading by cutting the track first and then positioning followers 18 with respect to the track, or by an accurate machining of track 32 after the positioning of the followers 18 has been set, both of these procedures are difficult and expensive. Compared to them, the process we have devised for forming cam 23 is extremely simple and any desired amount of preload can be produced. As a matter of fact, if after a purchaser had installed one of the indexing units he found that the amount of preload was not sufficient for the intended purpose, the preload could be increased merely by removing the cam 23 and machining one or both of walls 40 and 41 sufficiently to obtain the required preload. It will be apparent, of course, that the process for obtaining the exact fit or the exact preload does not necessarily involve the machining of all four walls that lie along lines 40 and 41. Any one or combination of these walls could be machined to obtain the required fit.

Should cam track 32 wear sufficiently after a long period of use that it no longer would hold follower 18 sufficiently tight to prevent a movement of plate 17, the remedy is most simple. Again, all that need be done is to remove cam 23 and machine one or more of the walls that lie along lines 40 and 41 until the walls 43 and 45 of the cam track 42 have been returned to their original (or required) dimensions with respect to the distance between the outer faces of adjacent cam follower bodies 21.

As will be readily apparent to those skilled in the art, shaft 24 is the input shaft and shaft 13 is the output shaft. The positioning of shaft B is fixed by the cam followers 18 in cam track 32. Cam track 32, illustrated, is a modified trapezoid cam displacement. The cam track, of course, would be varied upon the application involved.

With cam 23 rotating in the direction indicated by the arrow 50, shaft 13 will be rotated in the direction indicated by arrow 51. Thus as viewed in FIGURE 2, with the rotation of the cam 23, the lower follower 18 would soon leave the cam track 32 through exit 33. At this time the upper cam follower in dwell portion 36 would come to crossover 35 and would be switched over to dwell portion 34. At the same time a third follower, i.e. the one in line with the center of the shaft 13 in FIGURE 1, would enter the cam track 32 through entrance 37 and would proceed into dwell portion 36 of the cam. As long as two of the followers 18 are in the dwell portions 34 and 36, there is no movement of plate 17 or shaft 13. However, shaft 13 and plate 17 will be rotated as one follower leaves the track and another one enters it.

The foregoing description is for the purpose of complying with 35 U.S.C. 112 and should not be construed as imposing unnecessary limitations upon the appended claims inasmuch as modifications will be apparent to those skilled in the art.

We claim:

1. An indexing cam of cylindrical configuration having a cam track means thereabout with a pair of dwell portions positioned side by side about the outer surface of the cylinder, said track means having a pair of track walls facing in opposite directions, said cam being characterized by being made in at least two pieces having abutting faces normal to the cylindrical axis and positioned between the track walls at said dwell portions, and means releasably connecting said pieces whereby the distance between the furthermost cam walls may be reduced by the removal of material from one of said faces.

2. An indexing cam of cylindrical configuration having a cam track means thereabout with a pair of dwell portions positioned side by side about the outer surface of the cylinder, said track means having a pair of track walls facing in opposite directions, said cam being characterized by being made in three pieces having abutting faces normal to the cylindrical axis, each pair of abutting faces being between the track walls at said portions; and means releasably connecting said three pieces whereby said cam may be disassembled and material removed from said abutting faces to decrease the distance between the cam walls during said dwell period.

3. An indexing cam for use with a pair of followers having adjacent edges spaced a first distance apart with the furthermost edges of the followers being spaced a second distance apart when no pressure is applied to the followers, said cam comprising: a cylindrical cam having two ends and a cylindrical axis, said cam being formed of two end members and a center member, each member having a face abutting another member, said faces being normal to said axis; a pair of cam tracks about the outer surface of said cam, each track having a wall adjacent and a wall farthermost from the walls of the other track, said tracks having parallel dwell portions being parallel to one of said pairs of faces, respectively, the adjacent walls of said tracks at said dwell portions being closer together than said first distance, the furthermost walls of said tracks at said dwell portions being at least said second distance apart; and means releasably connecting said end members to said center member whereby said end members may be removed and said faces machined to reduce the distance between said furthermost walls.

4. An indexing cam for use with a pair of followers having adjacent edges spaced a first distance apart with the furthermost edges of the followers being spaced a seocnd distance apart when no pressure is applied to the followers, said cam comprising: a cylindrical cam having two ends and a cylindrical surface formed about an axis intersecting the ends, said cam being formed of at least one end member and a second member, said end member having a face abutting a corresponding face of said second member, said cam having a pair of cam tracks in said surface, said tracks being side by side in said surface and each track including a dwell portion parallel to the dwell portion of the other track, each track having a wall adjacent and a wall farthermost from the walls of the other track, the adjacent walls of said tracks at said dwell portions being closer together than said first distance; the furthermost walls of said tracks at said dwell portions being at least said second distance apart, the furthermost wall of the dwell portion of one track being defined by said end member and the adjacent wall of the dwell portion of said one track being defined by said second member; and means releasably connecting said members whereby said end members may be removed and at least one of said faces machined to reduce the distance between the furthermost walls.

5. An indexing cam comprising in combination: a frame; a first shaft rotatably mounted on said frame; a cam follower mounting plate affixed to one end of said shaft and positioned generally normal thereto; a plurality of cam followers affixed to said plate and extending from said plate in a direction opposite to that of said shaft, each of said followers being cylindrical and rotatable about its cylindrical axis with respect to the plate, said axes all lying in a circle concentric with said shaft and being spaced evenly apart, the adjacent edges of each adjacent pair of followers being spaced a first distance apart and the farthermost edges of each adjacent pair of followers being spaced a second distance apart when no preload is applied to said followers; a second shaft journaled in said frame and extending at right angles to said first shaft, said second shaft being in said direction from said plate with its axis offset to one side from the line defined by the axis of the first shaft; and a cylindrical cam releasably mounted on said second shaft, said cam having two ends and a cylindrical surface formed about the axis of the second shaft and extending between said ends, said cam being formed of at least one end member and a second member, said end member having a face abutting a corresponding face of said second member, said cam having a pair of cam tracks in said surface, said tracks being side by side in said surface and each track including a dwell portion parallel to the dwell portion of the other track, each track having a wall adjacent and a wall farthermost from the walls of the other track, the adjacent walls of said tracks at said dwell portions being closer together than said first distance, the furthermost walls of said tracks at said dwell portions being sufficiently less than said second distance apart to preload said followers, and means releasably connecting said members whereby when said cam becomes worn said end member may be removed and at least one of said faces machined to reduce the distance between the furthermost walls to restore the preload to said cam followers.

References Cited in the file of this patent
UNITED STATES PATENTS

| | | |
|---|---|---|
| 498,552 | Hunt | May 30, 1893 |
| 815,979 | Richards | Mar. 27, 1906 |
| 2,986,949 | Lancaster et al. | June 6, 1961 |

FOREIGN PATENTS

| | | |
|---|---|---|
| 26,943 | Switzerland | May 29, 1909 |
| 389,847 | Germany | Feb. 8, 1924 |